United States Patent
Fischer et al.

(10) Patent No.: US 8,186,713 B2
(45) Date of Patent: May 29, 2012

(54) VENTED AIR BAG

(75) Inventors: Kurt F. Fischer, Leonard, MI (US);
Heather Kramer, Macomb, MI (US);
Alberto Rodriguez, Rochester Hills, MI (US); Amit Sharma, Rochester Hills, MI (US); John Bauer, Troy, MI (US)

(73) Assignee: TRW Vehicle Safety Systems Inc., Washington, MI (US)

( * ) Notice: Subject to any disclaimer, the term of this patent is extended or adjusted under 35 U.S.C. 154(b) by 710 days.

(21) Appl. No.: 11/500,068

(22) Filed: Aug. 7, 2006

(65) Prior Publication Data
US 2006/0273562 A1 Dec. 7, 2006

Related U.S. Application Data

(63) Continuation-in-part of application No. 10/602,316, filed on Jun. 24, 2003, now abandoned.

(51) Int. Cl.
*B60R 21/239* (2006.01)
(52) U.S. Cl. .............. 280/739; 280/728.1; 280/742
(58) Field of Classification Search ............... 280/739, 280/728.1, 728.2, 728.3, 730, 731, 743.1, 280/743.2, 742, 730.1
See application file for complete search history.

(56) References Cited

U.S. PATENT DOCUMENTS

| | | | | |
|---|---|---|---|---|
| 3,758,133 A * | 9/1973 | Okada | ............................ | 280/739 |
| 5,280,953 A * | 1/1994 | Wolanin et al. | ................ | 280/739 |
| 5,405,166 A * | 4/1995 | Rogerson | ........................ | 280/739 |
| 5,492,363 A * | 2/1996 | Hartmeyer et al. | ............ | 280/739 |
| 6,017,057 A * | 1/2000 | O'Docherty | ................... | 280/739 |
| 6,471,239 B1* | 10/2002 | Nishijima et al. | ............ | 280/729 |
| 6,783,151 B2* | 8/2004 | Rasch et al. | ................... | 280/729 |
| 6,786,505 B2* | 9/2004 | Yoshida | ......................... | 280/729 |
| 6,932,385 B2* | 8/2005 | Hawthorn et al. | ............. | 280/739 |
| 7,118,127 B2* | 10/2006 | Damm | ........................... | 280/739 |
| 2004/0012180 A1* | 1/2004 | Hawthorn et al. | .............. | 280/739 |
| 2004/0262898 A1* | 12/2004 | Bauer et al. | ................... | 280/739 |
| 2006/0192371 A1* | 8/2006 | Abe | ............................... | 280/739 |

FOREIGN PATENT DOCUMENTS

| | | |
|---|---|---|
| DE | 10146483 | 4/2003 |
| DE | 10146493 | 4/2003 |
| JP | 11-129859 | 5/1999 |
| JP | 2000-16228 | 1/2000 |
| JP | 200016228 | 1/2000 |
| JP | 2001-260800 | 9/2001 |
| JP | 2003-137060 | 5/2003 |

* cited by examiner

*Primary Examiner* — Paul N Dickson
*Assistant Examiner* — Timothy Wilhelm
(74) *Attorney, Agent, or Firm* — Tarolli, Sundheim, Covell & Tummino LLP

(57) ABSTRACT

An apparatus (10) helps protect an occupant (20) of a vehicle (12). The apparatus (10) includes an inflatable vehicle occupant protection device (14) that includes panel (100) of material that helps define an inflatable volume (54) of the protection device. A vent opening (104) vents inflation fluid from the inflatable volume (54). A pleat (120) is folded in the panel (100). The pleat (120) is positioned against a vehicle surface (62) while the protection device (14) is in a normally deployed condition to help block inflation fluid from venting through the vent opening (104).

16 Claims, 7 Drawing Sheets

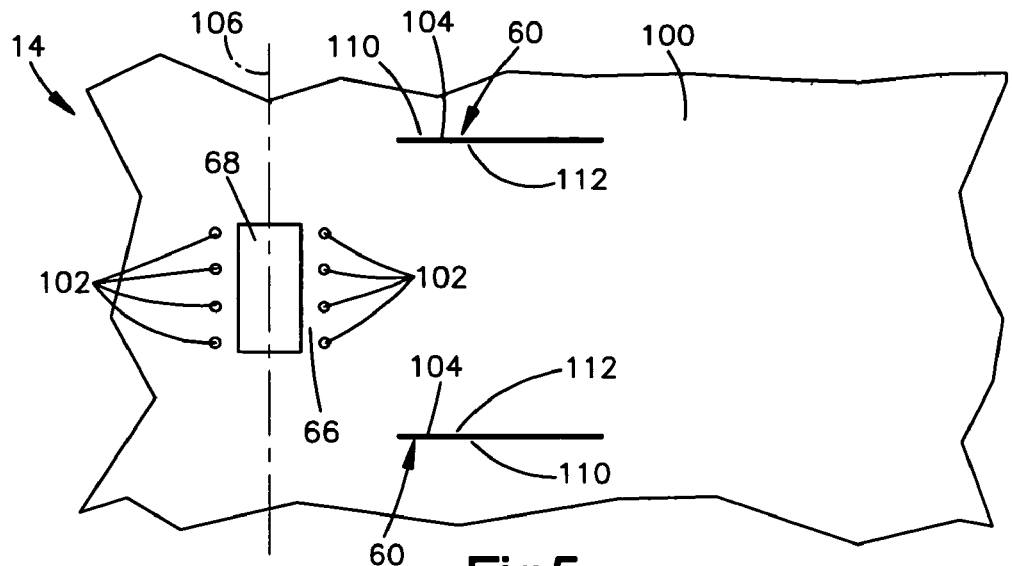
Fig.5
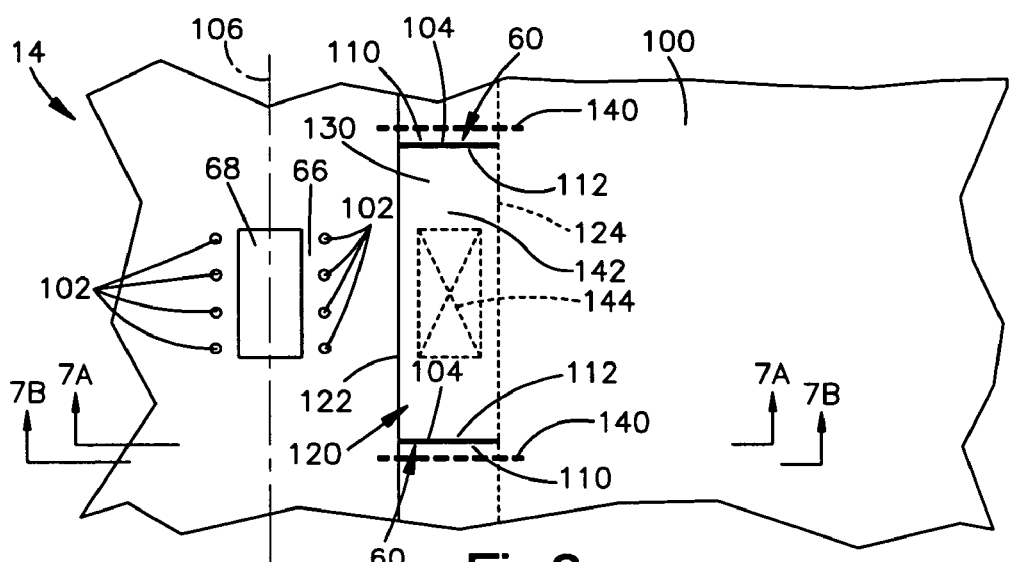
Fig.6
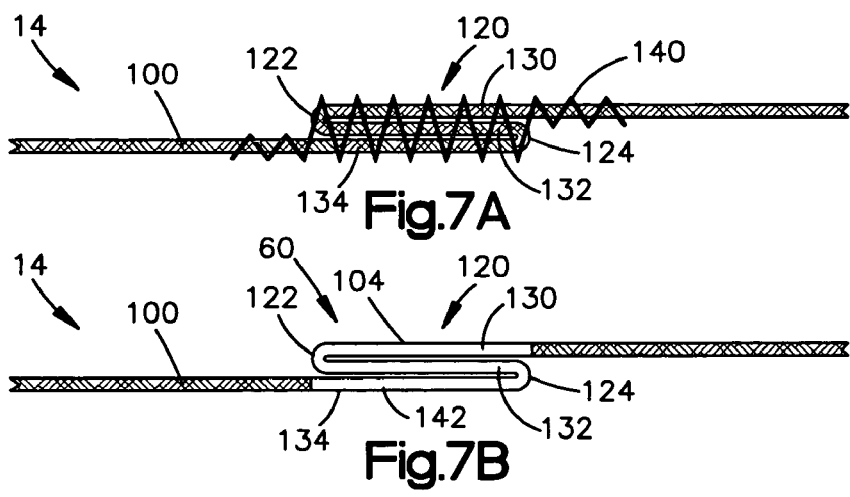
Fig.7A
Fig.7B

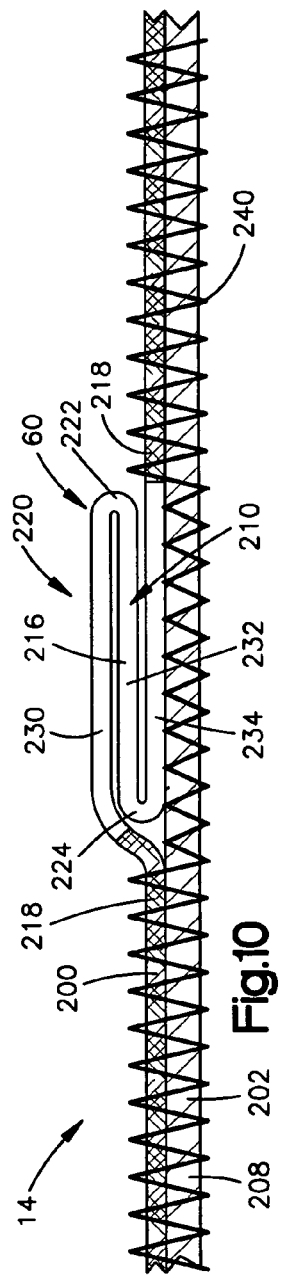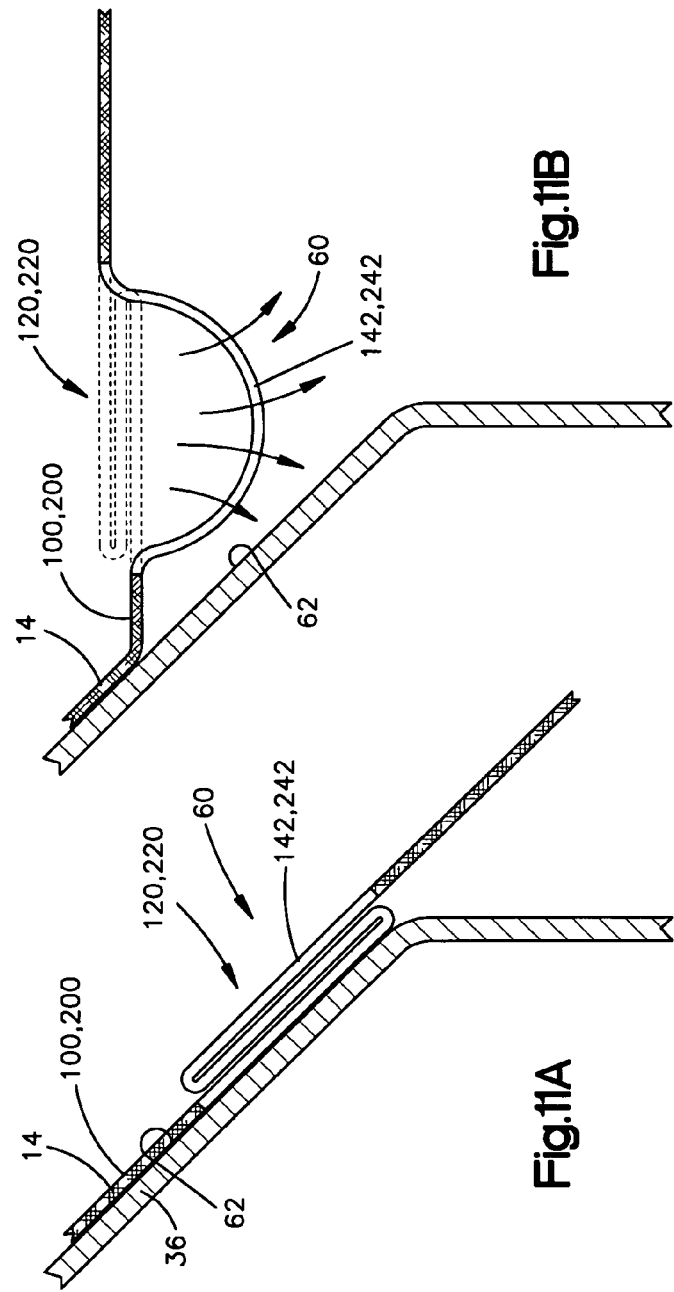

VENTED AIR BAG

RELATED APPLICATION

This application is a continuation-in-part of U.S. patent application Ser. No. 10/602,316, filed Jun. 24, 2003 now abandoned.

FIELD OF THE INVENTION

The present invention relates to an air bag for helping to protect an occupant of a vehicle upon the occurrence of an event for which inflation of the air bag is desired, such as a vehicle collision.

BACKGROUND OF THE INVENTION

It is known to provide an inflatable vehicle occupant protection device, such as an air bag, for helping to protect an occupant of a vehicle. One particular type of air bag is a front impact air bag inflatable between an occupant of a front seat of the vehicle and an instrument panel of the vehicle. Such air bags may be driver air bags or passenger air bags. When inflated, the driver and passenger air bags help protect the occupant from impacts with parts of the vehicle such as the instrument panel and/or a steering wheel of the vehicle.

Passenger air bags are typically stored in a deflated condition in a housing that is mounted in the vehicle instrument panel. An air bag door is connectable with the housing and/or instrument panel to help enclose and conceal the air bag in a stored condition. Upon deployment of the passenger air bag, the air bag door opens to permit the air bag to move to an inflated position. The air bag door opens as a result of forces exerted on the door by the inflating passenger air bag.

Driver air bags are typically stored in a deflated condition in a housing that is mounted on the vehicle steering wheel. An air bag cover is connectable with the housing and/or steering wheel to help enclose and conceal the air bag in a stored condition. Upon deployment of the driver air bag, the air bag cover opens to permit the air bag to move to an inflated position. The air bag cover opens as a result of forces exerted on the cover by the inflating driver air bag.

SUMMARY OF THE INVENTION

The present invention relates to an apparatus for helping to protect an occupant of a vehicle. The apparatus includes an inflatable vehicle occupant protection device comprising a panel of material that helps define an inflatable volume of the protection device. A vent opening vents inflation fluid from the inflatable volume. A pleat is folded in the panel. The pleat is positioned against a vehicle surface while the protection device is in a normally deployed condition to help block inflation fluid from venting through the vent opening.

The present invention also relates to an apparatus for helping to protect an occupant of a vehicle. The apparatus includes an inflatable vehicle occupant protection device comprises a panel of material that helps define an inflatable volume of the protection device. A vent opening is formed in the panel, and first and second edge portions of the panel extend along opposite sides of the vent opening. A pleat is folded in the panel across the vent opening such that the edge portions have pleated configurations. A connection interconnects overlying folded portions of the panel along the first edge portion to help maintain the pleated configuration of the first edge portion. The second edge portion is capable of unfolding from the pleated configuration to place the vent opening in an open condition for venting inflation fluid from the inflatable volume.

The present invention further relates to an apparatus for helping to protect an occupant of a vehicle. The apparatus includes an inflatable vehicle occupant protection device. The protection device includes a panel of material that helps define an inflatable volume of the protection device. A vent opening in the panel comprises a notch in the panel. The panel includes opposite end portions extending along opposite ends of the notch and an edge portion extending along the length of the notch between the end portions. A pleat is folded in the panel. The edge portion is folded in the pleat, thus positioning the end portions relative to each other a distance shorter than the length of the edge portion. A connection interconnects the end portions with adjacent panel portions of the protection device. The connection fixes the relative positions of the end portions. The edge portion is capable of unfolding from the pleated condition to place the vent opening in an open condition venting inflation fluid from the inflatable volume.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIGS. 5-7B are schematic views that illustrate a first configuration of an air bag vent for incorporation with the apparatus of the first and second embodiments;

FIGS. 8-10 are schematic views that illustrate a second configuration of an air bag vent for incorporation with the apparatus of the first and second embodiments; and FIGS. 11A and 11B are schematic illustrations depicting the operation of the vent configurations of FIGS. 5-10.

DESCRIPTION OF THE PREFERRED EMBODIMENTS

Figure 1:
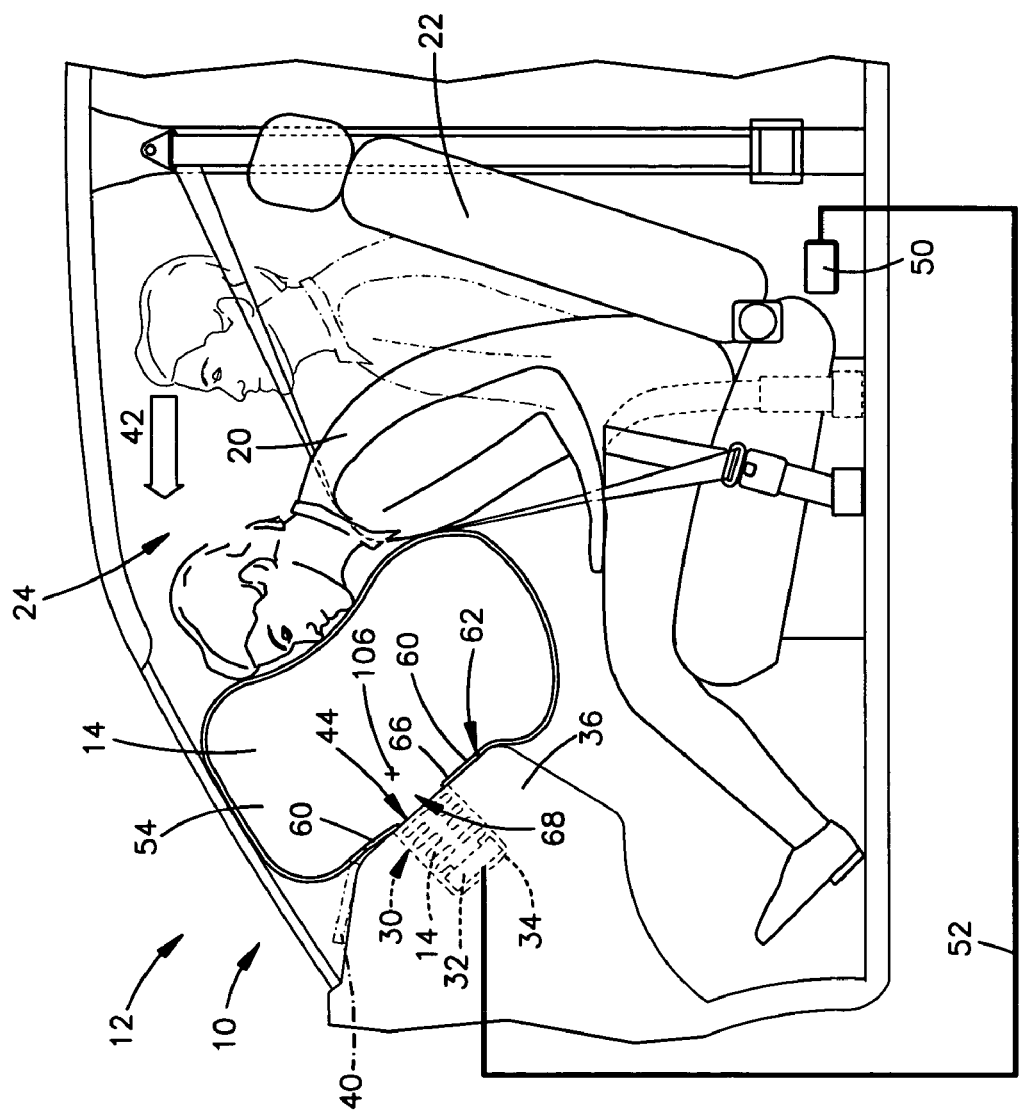
FIG. 1 is a schematic illustration of a passenger side of a vehicle including an apparatus comprising a passenger air bag that is shown in a stored condition and a deployed condition with a vehicle occupant in a first position, according to a first embodiment of the present invention.

The present invention relates to an inflatable vehicle occupant protection device for helping to protect an occupant of a vehicle. More particularly, the present invention relates to a front impact air bag having an improved vent configuration. According to a first embodiment illustrated in FIGS. 1 and 2, the apparatus 10 comprises a passenger front impact air bag 14 for helping to protect an occupant 20 on a passenger side 24 of a vehicle 12. In the embodiment illustrated in FIGS. 1 and 2, the occupant 20 is positioned in a seat 22 on the passenger side 24 of the vehicle 12.

Figure 2:
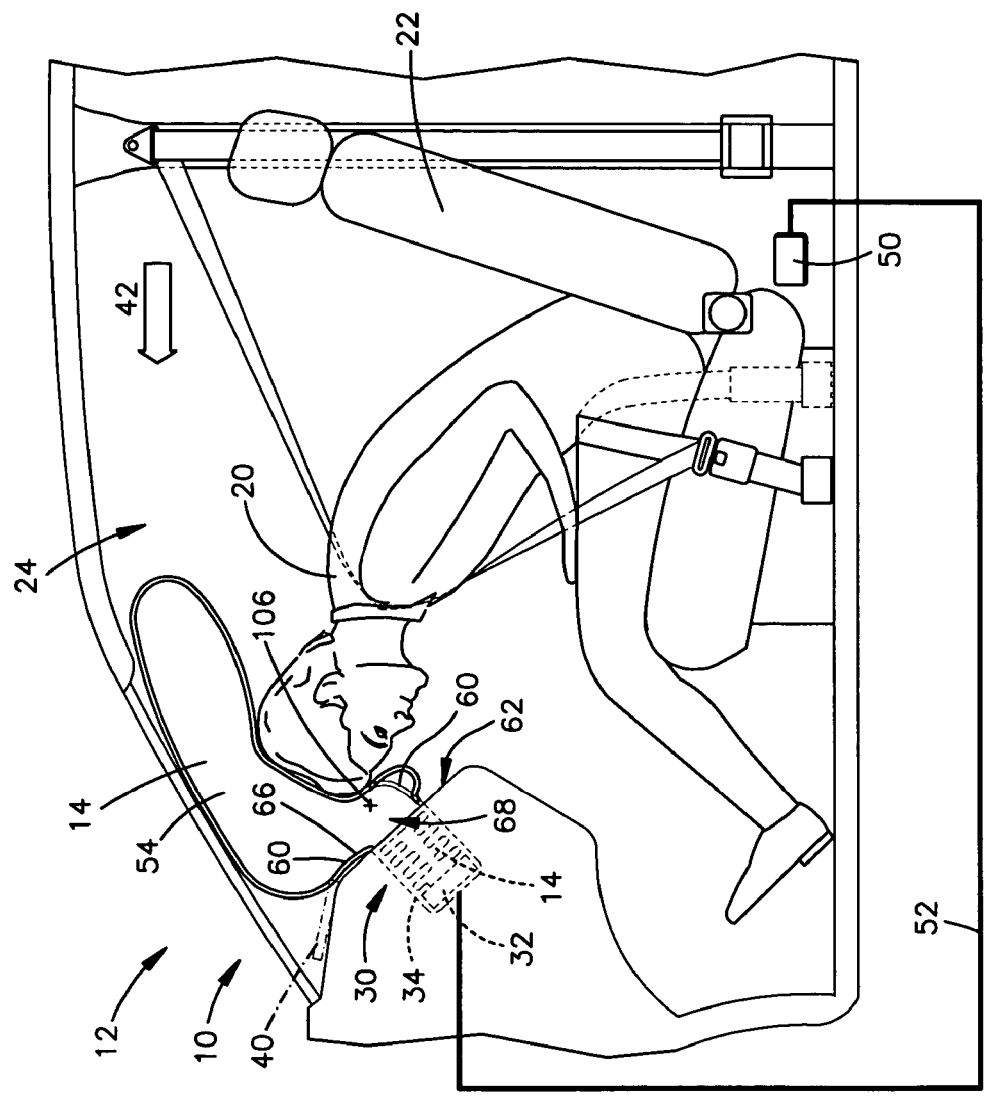
FIG. 2 is a schematic illustration of the deployed passenger air bag of FIG. 1 with the vehicle occupant in a second position.

As illustrated in FIGS. 1 and 2, the air bag 14 may be part of an air bag module 30 that includes an inflator 32 and a housing 34. The air bag 14 has a stored condition, indicated by dashed lines in FIGS. 1 and 2, in which the air bag is folded and placed in the housing 34. The housing 34 and thus the module 30 is connected to a dash or instrument panel 36 of the vehicle 12 on the passenger side 24 of the vehicle. The housing 34 helps contain and support the air bag 14 and inflator 32 in the instrument panel 36.

An air bag door 40 is releasably connected to the instrument panel 36 and/or the housing 34. In a closed condition (not shown), the air bag door 40 forms a cover for the module 30 and helps enclose the air bag 14 in the stored condition in the housing 34. The door 40 is movable to an opened condition illustrated in FIGS. 1 and 2 to uncover an opening 44 through which the air bag 14 may be deployed from the stored condition in the housing 34. The door 40 may be connected to the vehicle 12, e.g., the instrument panel 36, by means (not shown), such as a hinge, strap or tether.

The inflator 32 is actuatable to provide inflation fluid for inflating the air bag 14. The inflator 32 may be of any known type, such as stored gas, solid propellant, augmented, or hybrid. The apparatus 10 includes a sensor, illustrated schematically at 50, for sensing an event for which inflation of the air bag 14 is desired, such as a collision. The inflator 32 is operatively connected to the sensor 50 via lead wires 52.

Upon sensing the occurrence of an event for which inflation of the air bag 14 is desired, such as a vehicle collision, the sensor 50 provides a signal to the inflator 32 via the lead wires 52. Upon receiving the signal from the sensor 50, the inflator 32 is actuated and provides inflation fluid to an inflatable volume 54 of the air bag 14 in a known manner. The inflating air bag 14 exerts a force on the door 40 that moves the door to the opened condition. The air bag 14 inflates from the stored condition to a deployed condition illustrated in solid lines in FIGS. 1 and 2. The air bag 14, while inflated, helps protect the vehicle occupant 20 from impacts with parts of the vehicle 12, such as the instrument panel 36.

According to the present invention, the air bag 14 includes vents illustrated schematically at 60. The vents 60 are arranged about a portion of the air bag 14, referred to as a mouth or throat 66, that surrounds an inflation fluid inlet opening 68 of the air bag. The throat 66 of the air bag 14 is connected to the air bag module 30, e.g., to the housing 34. The inflator 32, when actuated, directs inflation fluid through the throat 66 into the air bag 14. The vents 60 are presented facing toward a surface 62 of the vehicle 12. In the first embodiment illustrated in FIGS. 1 and 2, the surface 62 comprises a surface of the instrument panel 36 adjacent the opening 44.

In FIG. 1, the occupant 20 moves from a normal seated position, in a forward direction indicated generally by the arrow labeled 42 in FIG. 1, toward the instrument panel 36. At the same time, the air bag 14 inflates and deploys from its stored position in the instrument panel 36. Since the occupant 20 starts moving from the normal seated position, the air bag 14 is free to inflate to a normal inflated position illustrated in FIG. 1. The occupant 20 thus moves into engagement with the normally inflated and positioned air bag 14 as shown in FIG. 1.

When the air bag 14 is in the normally inflated position of FIG. 1, the vents 60 are positioned against the surface 62. The instrument panel 36, particularly the surface 62, acts as a reaction surface against which the air bag 14 is deployed. Because of this, the surface 62 of the instrument panel 36 exerts reaction forces on the air bag 14 and, more specifically, the vents 60, which helps maintain the vents closed.

Thus, in the case of air bag deployment with a normally seated occupant 20, the vents 60 are thus closed and inflation fluid flow through the vents is blocked. When the occupant 20 engages the air bag 14, the occupant pushes the air bag towards the instrument panel 36. As a result, the portion of the air bag 14 including the vents 60 is urged against the surface 62, which increases the reaction forces holding the vents closed. This helps hold the vents 60 closed and helps further to block inflation fluid from flowing through the vents. The vents 60, being held closed when the air bag 14 is in the normally inflated position, helps the air bag 14 maintain a desired inflated pressure. As a result, in the normally inflated position, the air bag 14 helps protect the vehicle occupant 20 from impacts with parts of the vehicle 12, such as the instrument panel 36.

In FIG. 2, the occupant 20 moves in the forward direction indicated by the arrow labeled 42 into engagement with the air bag 14 from a position in which the occupant is leaned away from the normal seating position of FIG. 1. Specifically, in FIG. 2, the occupant 20 is leaned forward from the normal seating position as the air bag 14 inflates and deploys from its stored position in the instrument panel 36. Since the occupant 20 is leaned forward from the normal seated position, the occupant blocks the air bag 14 from inflating to the normal inflated position illustrated in FIG. 1. Instead, the air bag 14 inflates to a position away from the normally inflated position, as represented in FIG. 2.

Because the air bag 14 is blocked from inflating to the normal position, at least a portion of the throat 66, and thus at least some of the vents 60, are spaced away from the surface 62 when the air bag is in the inflated position. Thus, in the inflated condition of FIG. 2, at least some of the vents 60 are free to open and vent inflation fluid from the air bag 14. As a result, the air bag may have a reduced inflation pressure and/or may move toward the occupant with a reduced amount of force.

Those skilled in the art will appreciate that the air bag 14 illustrated in FIGS. 1 and 2, when inflated, is adapted to deploy and pressurize to a normally inflated position when the air bag is free from obstruction. The air bag 14 may thus be maintained at a desired inflation pressure, which allows the air bag to absorb impact forces and help protect the vehicle occupant. The air bag 14 is also adapted to vent inflation fluid when an obstruction, such as an occupant positioned away from the normal seated position, blocks the air bag from inflating and deploying to the normal inflated position. As a result, the air bag 14 may inflate toward the occupant with a reduced force.

The air bag vents 60 of the present invention help maintain the air bag 14 at a desired inflation pressure when deployed to the normally inflated position. The air bag vents 60 of the present invention also help vent inflation fluid from the air bag 14 in the event that the air bag does not inflate to its normal inflated position.

Figure 3:
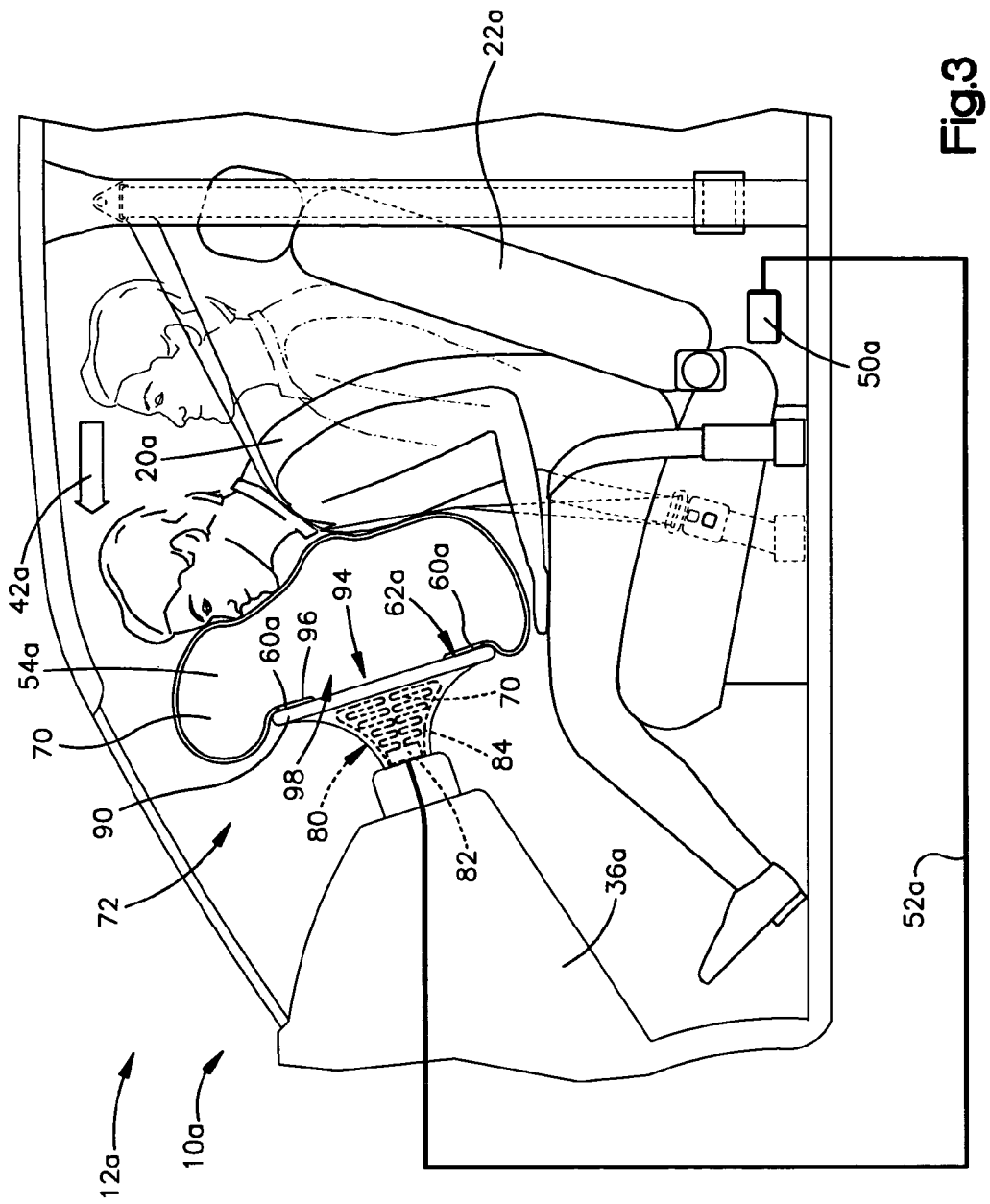
FIG. 3 is a schematic illustration of a driver side of a vehicle including an apparatus comprising a driver air bag that is shown in a stored condition and a deployed condition with a vehicle occupant in a first position, according to a second embodiment of the present invention.
Figure 4:
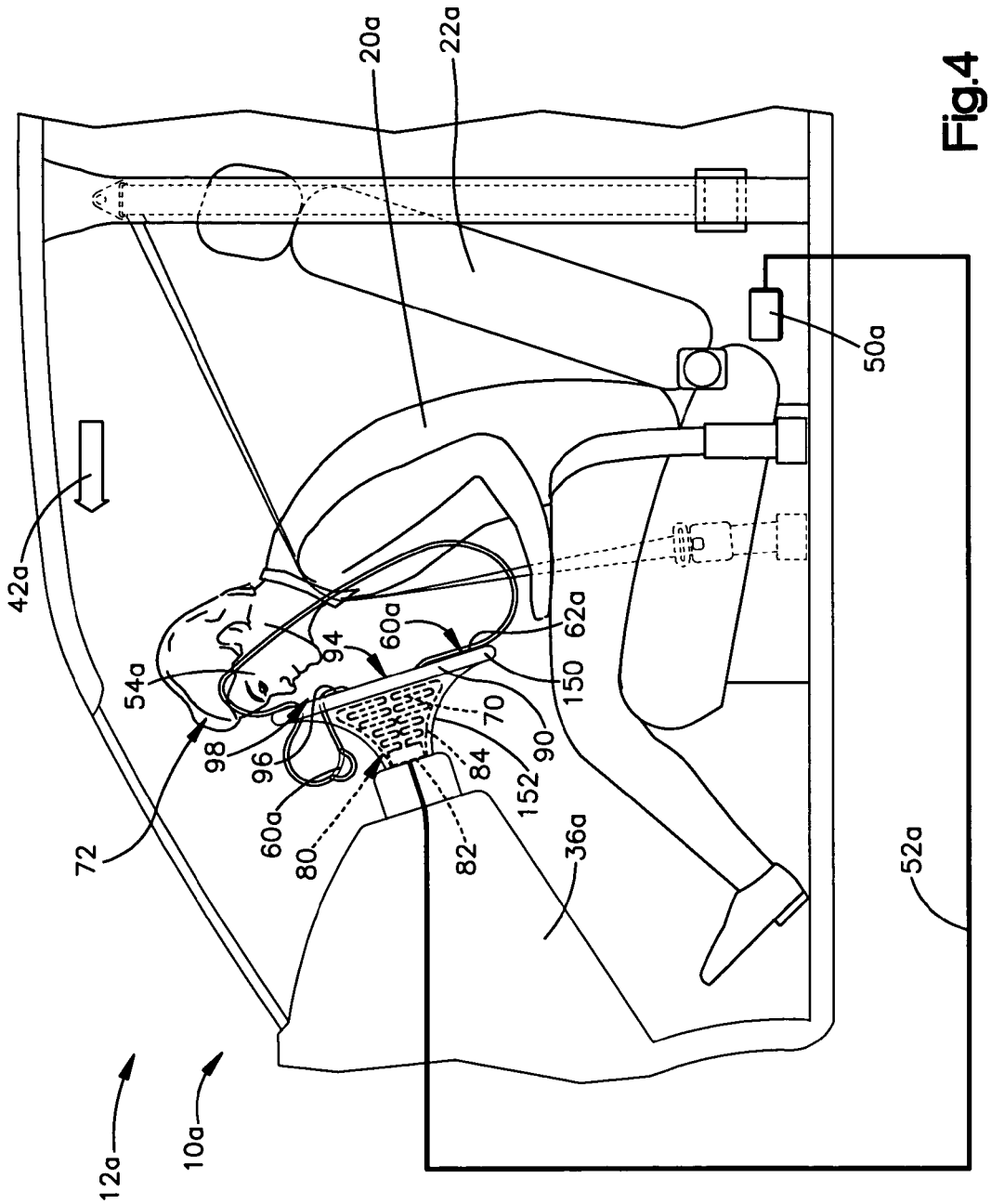
FIG. 4 is a schematic illustration of the deployed driver air bag of FIG. 3 with the vehicle occupant in a second position.

A second embodiment of the present invention is illustrated in FIGS. 3 and 4. The second embodiment of the invention is similar to the first embodiment of the invention illustrated in FIGS. 1 and 2. Accordingly, numerals similar to those of FIGS. 1 and 2 will be utilized in FIGS. 3 and 4 to identify similar components, the suffix letter "a" being associated with the numerals of FIGS. 3 and 4 to avoid confusion. The second embodiment of the present invention is similar to the first embodiment (FIGS. 1 and 2), except that the second embodiment (FIGS. 3 and 4) comprises a driver front impact air bag.

Referring to FIGS. 3 and 4, the apparatus 10a of the second embodiment comprises a driver front impact air bag 70 for helping to protect an occupant 20a on a driver side 72 of a vehicle 12a. The occupant 20a is positioned on a seat 22a in the driver side 72 of the vehicle 12a.

As illustrated in FIGS. 3 and 4, the air bag 70 may be part of an air bag module 80 that includes an inflator 82 and a housing 84. The air bag 70 has a stored condition, indicated by dashed lines in FIGS. 3 and 4, in which the air bag is folded and placed in the housing 84. The housing 84 and thus the module 80 are connected to a steering wheel 90 of the vehicle 12a on the driver side 72 of the vehicle. The housing 84 helps contain and support the air bag 70 and inflator 82 in the steering wheel 90.

An air bag cover (not shown) is releasably connected to the steering wheel 90 and/or the housing 84. In a closed condition, the air bag cover forms a cover for the module 80 and helps enclose the air bag 70 in the stored condition in the housing 84. The cover is movable to an opened condition to uncover an opening 94 through which the air bag 70 may be deployed from the stored condition in the housing 84.

The inflator 82 is actuatable to provide inflation fluid for inflating the air bag 70. The inflator 82 may be of any known type, such as stored gas, solid propellant, augmented, or hybrid. The apparatus 10a includes a sensor, illustrated schematically at 50a, for sensing an event for which inflation of the air bag 70 is desired, such as a collision. The inflator 82 is operatively connected to the sensor 50a via lead wires 52a.

Upon sensing the occurrence of an event for which inflation of the air bag 70 is desired, such as a vehicle collision, the sensor 50a provides a signal to the inflator 82 via the lead wires 52a. Upon receiving the signal from the sensor 50a, the inflator 82 is actuated and provides inflation fluid to an inflatable volume 54a of the air bag 70 in a known manner. The inflating air bag 70 exerts a force on the cover that moves the cover to the opened condition. The air bag 70 inflates from the stored condition to a deployed condition illustrated in solid lines in FIGS. 3 and 4. The air bag 70, while inflated, helps protect the vehicle occupant 20a from impacts with parts of the vehicle 12a, such as the steering wheel 90.

According to the present invention, the air bag 70 includes vents illustrated schematically at 60a. The vents 60a are arranged about a portion of the air bag 70, referred to as a mouth or throat 96, that surrounds an inflation fluid inlet opening 98 of the air bag. The throat 96 of the air bag 70 is connected to the air bag module 80, e.g., to the housing 84. The inflator 82, when actuated, directs inflation fluid through the throat 96 into the air bag 70. The vents 60a are presented facing toward a surface 62a of the vehicle 12a. In the second embodiment illustrated in FIGS. 3 and 4, the surface 62a comprises a surface of the steering wheel 90 adjacent the opening 94.

In FIG. 3, the occupant 20a moves from a normal seated position, in a forward direction indicated generally by the arrow labeled 42a in FIG. 3, toward the instrument panel 36a. At the same time, the air bag 70 inflates and deploys from its stored position in the steering wheel 90. Since the occupant 20a starts moving from the normal seated position, the air bag 70 is free to inflate to a normal inflated position illustrated in FIG. 3. The occupant 20a thus moves into engagement with the normally inflated and positioned air bag 70 as shown in FIG. 3.

When the air bag 70 is in the normally inflated position of FIG. 3, the vents 60a are positioned against the surface 62a. The surface 62a acts as a reaction surface against which the air bag 70 is deployed. Because of this, the surface 62a exerts reaction forces on the air bag 70 and, more specifically, the vents 60a, which helps maintain the vents closed.

Thus, in the case of air bag deployment with a normally seated occupant 20a, the vents 60a are thus closed and inflation fluid flow through the vents is blocked. When the occupant 20a engages the air bag 70, the occupant pushes the air bag towards the instrument panel 36a and toward the steering wheel 90. As a result, the portion of the air bag 70 including the vents 60a is urged against the surface 62a, which increases the reaction forces holding the vents closed. This helps hold the vents 60a closed and helps further to block inflation fluid from flowing through the vents. The vents 60a, being held closed when the air bag 70 is in the normally inflated position, helps the air bag maintain a desired inflated pressure. As a result, in the normally inflated position, the air bag 70 helps protect the vehicle occupant 20a from impacts with parts of the vehicle 12a, such as the instrument panel 36a or steering wheel 90.

In FIG. 4, the occupant 20a moves in the forward direction indicated by the arrow labeled 42a into engagement with the air bag 70 from a position in which the occupant is leaned away from the normal seating position of FIG. 3. Specifically, in FIG. 4, the occupant 20a is leaned forward of the normal seating position as the air bag 70 inflates and deploys from its stored position in the steering wheel 90. Since the occupant 20a is positioned away from the normal seated position, the occupant blocks the air bag 70 from inflating to the normal inflated position of FIG. 3. Instead, the air bag 70 inflates to a position away from the normally inflated position, as represented in FIG. 4.

In FIG. 4, the occupant 20a blocking deployment of the air bag 70 causes a portion of the air bag to deploy toward the instrument panel 36a through a space defined between a rim portion 150 and hub portion 152 of the steering wheel 90. Because of this, at least some of the vents 60a are spaced away from the surface 62a when the air bag is in the inflated position. Thus, in the inflated condition of FIG. 4, at least some of the vents 60a are free to open and vent inflation fluid from the air bag 70. As a result, the air bag 70 may have a reduced inflation pressure and/or may move toward the occupant 20a with a reduced amount of force.

Those skilled in the art will appreciate that the air bag 70 illustrated in FIGS. 3 and 4, when inflated, is adapted to deploy and pressurize to a normally inflated position when the air bag is free from obstruction. The air bag 70 may thus be maintained at a desired inflation pressure, which allows the air bag to absorb impact forces and help protect the vehicle occupant. The air bag 70 is also adapted to vent inflation fluid when an obstruction, such as an occupant 20a positioned away from the normal seated position, blocks the air bag from inflating and deploying to the normal inflated position. As a result, the air bag 70 may inflate toward the occupant 20a with a reduced force.

The air bag vents 60a of the present invention help maintain the air bag 70 at a desired inflation pressure when deployed to the normally inflated position. The air bag vents 60a of the present invention also help vent inflation fluid from the air bag 70 in the event that the air bag does not inflate to its normal inflated position.

Those skilled in the art will appreciate that, in the embodiments illustrated in FIGS. 1-4, the vents are blocked from releasing inflation fluid when the air bag is inflated to the normal position as shown in FIGS. 1 and 3. It will also be appreciated that the vents release inflation fluid from the air bag when the air bag is blocked from inflating to its normal position, as shown in FIGS. 2 and 4. It will further be appreciated that the air bag may be blocked from inflating to the normally inflated position in a manner other than that shown in FIGS. 2 and 4.

For example, if the occupant is leaned in an inboard or outboard direction (i.e., to the right or left as viewed facing forward in the vehicle), the occupant may block inflation of a lateral portion of the air bag. As another example, if the vehicle is involved in an event that results in the occupant moving toward the air bag in an angular or diagonal direction, such as an angular or offset collision, the occupant may engage a lateral portion of the air bag. As a further example, if an object other than an occupant occupies the vehicle seat, the air bag may be blocked from deploying to the normally inflated position.

In the event that the occupant engages only a portion of the air bag (e.g., during an offset collision), the vents located near the portion of the air bag engaged by the occupant may be urged toward the vehicle surface, while the remaining vents are not urged against the surface or are moved away from the surface. According to the present invention, the location of the vents on the air bags of the first and/or second embodiments may be used to tailor the restraint performance of the air bags.

For example, in an angular or offset collision, the direction of crash forces is angular with respect to the forward direction of vehicle travel (e.g., the forward directions 42 and 42a of FIGS. 1-4). During these events, the occupant may move toward vehicle structure such as an A-pillar, windshield, side window, or roof/visor of the vehicle. According to the present invention, the air bag may include vents presented toward these structures. Thus, in a collision where the occupant moves the air bag toward these structures, the vents engage the structure and block inflation fluid from venting, which helps increase or maintain pressurization in that region of the air bag. The air bag may thus be adapted to respond to varying dynamic conditions experienced in an angular or offset collision as opposed to a frontal impact.

FIGS. 5-7B illustrate a first configuration of the air bag vents 60 and 60a depicted in FIGS. 1-4. The vent configuration of FIGS. 5-7B may be used to construct the vents 60 of the passenger air bag 14 (FIGS. 1 and 2) or the vents 60a of the driver air bag 70 (FIGS. 3 and 4). For simplicity, the air bag vent configurations illustrated in FIGS. 5-7B are illustrated and described as being associated with the passenger air bag 14 of FIGS. 1 and 2. Those skilled in the art, however, will appreciate that the air bag vent configuration of FIGS. 5-7B could be associated with the driver air bag 70 of FIGS. 3 and 4.

Referring to FIG. 5, the air bag 14 includes a panel 100 that helps define the inflatable volume 54 (see FIGS. 1 and 2) of the air bag. The panel 100 may, for example, be a one-piece or multi-piece center panel that has opposite end portions interconnected to form a loop and opposite side portions interconnected with respective side panels (not shown) to define the inflatable volume 54. The panel 100 includes a plurality of apertures 102 for connecting the air bag 14 to the air bag module 30, e.g., to the housing 34 (see FIGS. 1 and 2). The apertures 102 extend through the throat 66 of the air bag 14 and are spaced about the inflation fluid inlet opening 68.

FIGS. 5-7B illustrate a configuration of the air bag 14 that includes two vents 60. The air bag 14 could, however, include a single vent or three or more vents. In the embodiment of FIGS. 5-7B, the vents 60 comprise longitudinally extending vent openings 104 in the panel 100. The vent openings 104 have a generally linear slit or slotted configuration. Those skilled in the art, however, will appreciate that the vent openings 104 may have alternative configurations, such as curved or curvilinear configurations.

The vent openings 104 may be formed in various manners. For example, a vent opening 104 may be formed by a cut line that removes little or no material from the panel 100. In this example, the vent opening 104 takes the form of a slit in the panel 100. As another example, a vent opening 104 may be formed by removing from the panel 100 a piece of material having a defined shape, such as an elongated rectangular shape. In this second example, the vent opening 104 takes the form of a slot in the panel 100. The vent openings 104, when formed in the panel 100, help define first and second edge portions 110 and 112 of the panel that extend along opposite sides of the vent openings.

For purposes of establishing a spatial and geometric reference point in describing the air bag 14 of the present invention, a lateral axis 106 of the air bag is shown in FIGS. 1, 2, 5, and 6. The lateral axis 106 extends horizontally in the vehicle 12 and perpendicularly to a direction of forward vehicle travel. Thus, referring to FIGS. 5 and 6, the vent openings 104 extend perpendicular to the lateral axis 106. Those skilled in the art will appreciate that a lateral axis could be established in FIGS. 3 and 4 for the driver air bag 70. Since the driver air bag 70 rotates with the steering wheel 90, the lateral axis for the driver air bag would be established as extending horizontally in the vehicle 12 and perpendicularly to a direction of forward vehicle travel when the steering wheel 90 is at a center, straight forward steering position.

According to the present invention, a pleat 120 is folded in the panel 100 and helps define the vents 60. Referring to FIGS. 6-7B, the pleat 120 is formed by folding the panel 100 along fold lines 122 and 124 that extend generally parallel to the lateral axis 106. The pleat 120 includes overlying portions 130, 132, and 134 of the panel 100 that are defined by the fold lines 122 and 124. As shown in FIG. 6, the first and second edge portions 110 and 112 of the panel adjacent the vent openings 104 are folded along the fold lines 122 and 124 and thus have pleated configurations. The pleat 120 thus intersects and extends "across" the vent openings 104, i.e., the vent openings are included in the folded up material of the pleat 120 as shown in FIG. 11B.

Referring to FIGS. 6 and 7A, connections 140 interconnect overlying folded portions of the panel 100 along the first edge portions 110. In the embodiment illustrated in FIGS. 6 and 7A, the connections 140 are formed by stitching together the overlying portions of the panel 100. Alternative methods, such as ultrasonic welding, heat bonding, and adhesive bonding may also be used to form the connections 140.

The connections 140 help maintain the pleated configuration of the panel 100 along the first edge portions 110 (see FIGS. 6 and 7A). Referring to FIG. 6, in this configuration, the vent openings 104 are positioned between the connections 140. As shown in FIGS. 6 and 7B, a pleated central portion 142 of the panel 100 extends between vent openings 104 and includes the second edge portions 112. The second edge portions 112 and the central portion 142 adjacent the second edge portions are free from connections for helping to maintain the pleat 120. The central portion 142 may be entirely free from connections or, alternatively, may include a central connection 144 (see FIG. 6) for helping to maintain the pleat 120 at a location positioned centrally on the central portion 142 and away from the second edge portions 112.

Figure 8:
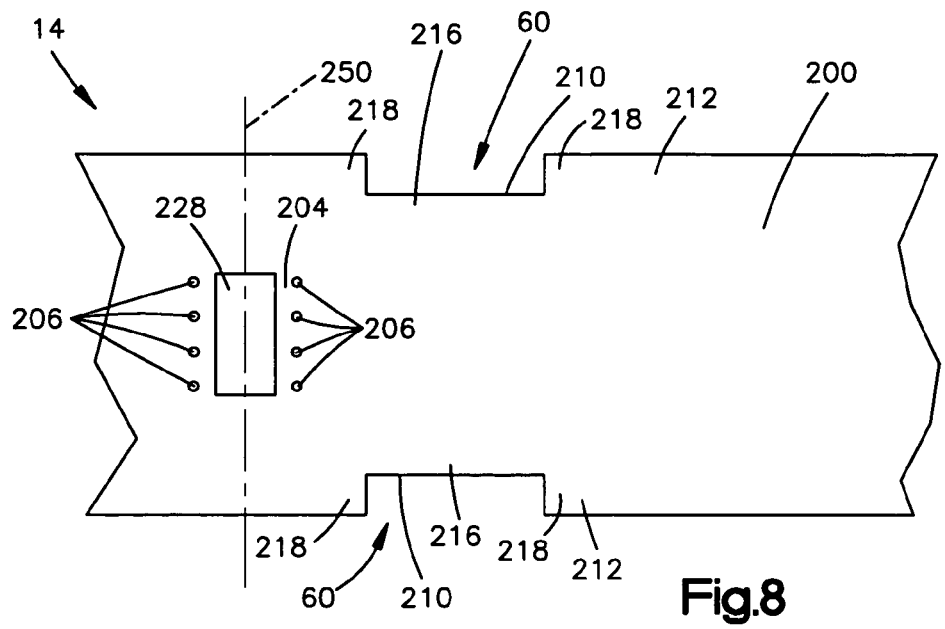
Figure 9:
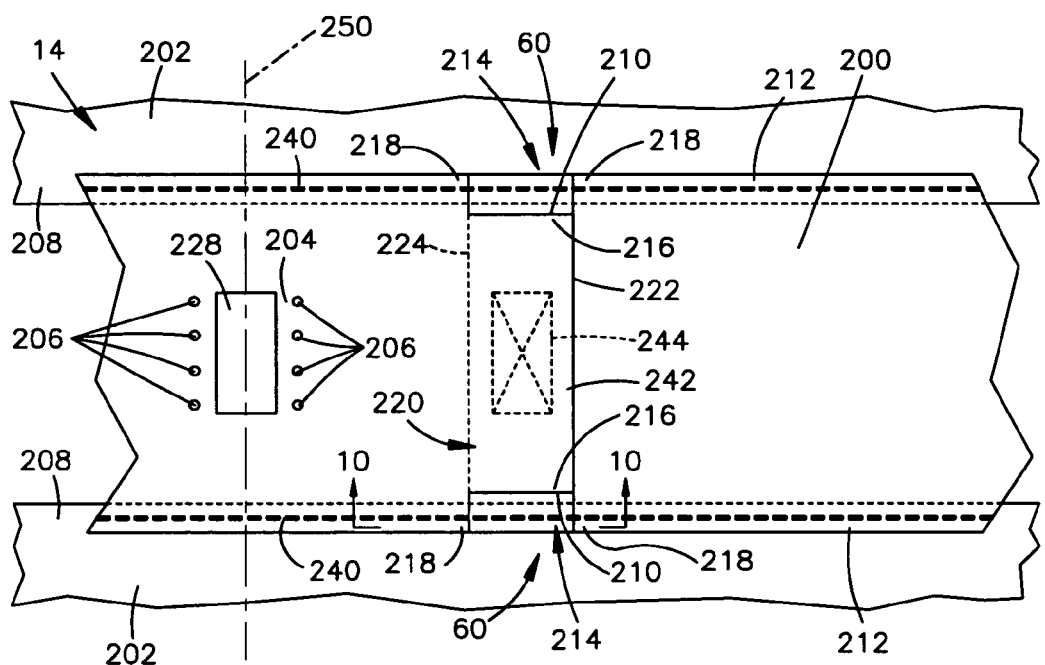

FIGS. 8-10 illustrate a second configuration of the air bag vents 60 and 60a depicted in FIGS. 1-4. The vent configuration of FIGS. 8-10 may be used to construct the vents 60 of the passenger air bag 14 (FIGS. 1 and 2) or the vents 60a of the driver air bag 70 (FIGS. 3 and 4). For simplicity, the air bag vent configurations illustrated in FIGS. 8-10 are illustrated and described as being associated with the passenger air bag 14 of FIGS. 1 and 2. Those skilled in the art, however, will appreciate that the air bag vent configuration of FIGS. 8-10 could be associated with the driver air bag 70 of FIGS. 3 and 4.

Referring to FIG. 8, the air bag 14 includes a panel 200 that helps define the inflatable volume 54 (see FIGS. 1 and 2) of the air bag. The panel 200 may, for example, be a center panel that has opposite end portions interconnected to form a loop and opposite side portions interconnected with respective side panels 202 (FIG. 9) to define the inflatable volume. The panel 200 includes a plurality of apertures 206 for connecting the air bag 14 to the air bag module 30, e.g., to the housing 34 (see FIGS. 1 and 2). The apertures 206 extend through the throat 204 of the air bag 14 and are spaced about the inflation fluid inlet opening 228.

FIGS. 8 and 9 illustrate a configuration of the air bag 14 that includes two vents 60. The air bag 14 could, however, include a single vent or three or more vents. In the embodiment of FIGS. 8 and 9, the vents 60 comprise longitudinally extending notches 210 in opposite outer edge portions 212 of the panel 200 that help define vent openings 214. More specifically, the notches 210 and vent openings 214 are defined by opposite end portions 218 of panel material and a longitudinal edge portion 216 of panel material that extends between the end portions. The vent openings 214 have a generally rectangular configuration. Those skilled in the art, however, will appreciate that the vent openings 214 may have alternative configurations, such as rounded or curved configurations.

The vent openings 214 have respective lengths that extend perpendicular to a lateral axis 250 of the air bag 14. According to the present invention, a pleat 220 is folded in the panel 200 and helps define the vents 60. Referring to FIGS. 9 and 10, the pleat 220 is formed by folding the panel 200 along fold lines 222 and 224 that extend generally parallel to the lateral axis 250. The pleat 220 includes overlying portions 230, 232, and 234 of the panel 200 that are defined by the fold lines 222 and 224. As shown in FIG. 9, the edge portions 216 of the panel 200 adjacent the vent openings 214 are folded along the fold lines 222 and 224 and thus have pleated configurations. The pleat 220 intersects the vent openings 214 and the vent openings are thus folded up in the pleat 220.

Referring to FIGS. 9 and 10, connections 240 interconnect the edge portions 212 of the panel 200 with adjacent panels 202 of the air bag 14. In the embodiment illustrated in FIG. 9, the connections 240 are formed by stitching together the overlying portions of the panels 200 and 202. Alternative methods, such as ultrasonic welding, heat bonding, and adhesive bonding may also be used to form the connections 240.

The panels 200 and 202, when interconnected by the connections 240, help define the inflatable volume 54 of the air bag 14. For example, in the embodiments of FIGS. 9 and 10, the panel 200 may be a center panel of the air bag 14 that is connectable with the side panels 202 of the air bag. In this configuration, the connections 240 may interconnect the edge portions 212 of the panel 200 with respective edge portions 208 of the side panels 202.

As shown in FIGS. 9 and 10, the connections 240 interconnect the end portions 218 with the panels 202 while leaving the edge portions 216 without being connected directly to the panels 202. Since the edge portions 216 are folded in the pleat 220, the end portions 218 are secured to the panels 202 at a distance from each other that is shorter than the length of the edge portions 216. The connections 240 thus maintain the relative positions of the end portions 218 as shown in FIG. 10 and help maintain the pleated configuration of the panel 200 while leaving free from connections a pleated central portion 242 of the panel 200 that extends between the vent openings 214 (see FIG. 9). Alternatively, the central portion 242 may include a central connection 244 for interconnecting overlying portions of the panel 200 located centrally on the central portion 242. The connections 240 may thus serve the dual purpose of helping to maintain the pleat 220 and connecting the panel 200 with the side panels 202 of the air bag 14 to help define the inflatable volume 54.

Those skilled in the art will appreciate that the configuration of the air bags disclosed herein could be improved, changed, or modified without departing from the teachings of the present invention. For example, in the embodiment of FIGS. 8-10, the notches 210 could be eliminated and the connections 240 could be terminated on opposite sides of the pleat 220. This would leave the pleat 220 free to unfold along the edge portions 212 of the panel 200, thus placing the vents 60 in the open condition.

FIGS. 11A and 11B illustrate schematically the operation of the vents shown in FIGS. 5-7B and the vents shown in FIGS. 8-10. FIG. 11A illustrates the condition of the air bag vents corresponding to the normally seated occupant conditions shown in FIGS. 1 and 3. FIG. 11B illustrates the condition of the air bag vents corresponding to the occupant positions shown in FIGS. 2 and 4 in which the occupant is away from the normally seated occupant conditions.

For simplicity, the air bag conditions illustrated in FIGS. 11A and 11B are illustrated and described as being associated with the vents 60 of the passenger air bag 14 of FIGS. 1 and 2. FIGS. 11A and 11B thus illustrate the passenger air bags 14, vents 60, and the surface 62 of the instrument panel 36. Those skilled in the art, however, will appreciate that FIGS. 11A-11B are also illustrative of the vents 60a illustrated with the driver air bag 70 of FIGS. 3 and 4.

In FIG. 11A, the air bag 14 is shown in a position that corresponds to the normally inflated position of the air bag illustrated in FIG. 1. In FIG. 11B, the air bag 14 is shown in a position that corresponds to being positioned away from the normally inflated position, as illustrated in FIG. 2. Referring to FIG. 11A, when the air bag 14 is in the normally inflated position, the pleat 120, 220 is positioned against the surface 62 of the instrument panel 36. As described above, the surface 62 acts as a reaction surface and provides reaction forces that help block the pleat 120, 220 from unfolding and thus helps maintain the vent 60 in the closed condition helping to block inflation fluid from venting from the air bag 14. Referring to FIG. 11B, when the air bag 14 positioned away from the normally inflated position, the pleat 120, 220 is positioned away from the surface 62 of the instrument panel 36. This leaves the pleated central portion 142, 242 to unfold, which places the vent 60 in the open condition and permits inflation fluid to vent from the air bag 14, as illustrated generally by the arrows in FIG. 11B. According to the present invention, the vents 60 may be configured to vent inflation fluid in a generally lateral direction in the vehicle 12, generally parallel to the lateral axis 106 (see FIG. 2). The vents 60 may, for example, vent the inflation fluid along the surface 62 of the instrument panel 36.

From the above description of the invention, those skilled in the art will perceive improvements, changes and modifications. For example, while the air bag vents of the present invention have been illustrated in implementations with driver and passenger front impact air bags, the air bag vents could be implemented in other inflatable vehicle occupant protection devices. For instance, the air bag vents of the present invention could be implemented in a side impact air bag, an inflatable knee bolster, or an inflatable side curtain. Such improvements, changes and modifications within the skill of the art are intended to be covered by the appended claims.

Having described the invention, the following is claimed:

1. An apparatus for helping to protect an occupant of a vehicle, the apparatus comprising:

an inflatable vehicle occupant protection device comprising a panel of material that helps define an inflatable volume of the protection device;
a vent opening for venting inflation fluid from the inflatable volume;
a pleat folded in the panel, the pleat being positioned against a vehicle surface while the protection device is in a normally deployed condition to help block inflation fluid from venting through the vent opening; and
a connection that interconnects the panel with adjacent portions in the protection device to maintain the pleated configuration of the panel adjacent the connection during inflation, pleated portions of the panel spaced from the connection being capable of unfolding from the pleated configuration to vent inflation fluid through the vent opening.

2. The apparatus recited in claim 1, wherein the pleat is positioned away from the vehicle surface when the protection device is obstructed from inflating to the normally deployed position, the pleat when spaced from the vehicle surface at least partially unfolding and releasing inflation fluid to flow out of the protection device through the vent opening.

3. The apparatus recited in claim 2, wherein the vent opening when in the open condition is configured to direct inflation fluid along the vehicle surface in a direction generally laterally in the vehicle.

4. The apparatus recited in claim 1, wherein the protection device is configured such that the pleat is urged against the vehicle surface when the protection device is in the normally deployed condition and a vehicle occupant moves into contact with the protection device.

5. The apparatus recited in claim 1, wherein the protection device comprises a passenger front impact air bag and the vehicle surface comprises a surface of an instrument panel of the vehicle.

6. The apparatus recited in claim 1, wherein the protection device comprises a driver front impact air bag and the vehicle surface comprises a surface of a steering wheel of the vehicle.

7. The apparatus recited in claim 1, wherein reaction forces from the vehicle surface urge overlying folded portions of the panel against each other to help prevent the pleat from unfolding when the protection device is in the normally deployed condition.

8. The apparatus recited in claim 1, wherein the connection comprises stitching.

9. The apparatus recited in claim 8, wherein the stitching comprises portions that help maintain the pleat in the panel and portions that interconnect adjacent panels of the protection device to help define the inflatable volume of the protection device.

10. An apparatus for helping to protect an occupant of a vehicle, the apparatus comprising:
an inflatable vehicle occupant protection device comprising a panel of material that helps define an inflatable volume of the protection device;
a vent opening for venting inflation fluid from the inflatable volume;
a pleat folded in the panel, the pleat being positioned against a vehicle surface while the protection device is in a normally deployed condition to help block inflation fluid from venting through the vent opening; and
a connection that interconnects the panel with adjacent portions of the protection device to help maintain the pleated configuration of the panel adjacent the connection, pleated portions of the panel spaced from the connection being capable of unfolding from the pleated configuration to vent inflation fluid through the vent opening, wherein the vent opening is at least partially defined by an edge portion of the panel, the edge portion being folded in the pleat.

11. The apparatus recited in claim 10, wherein the edge portion when in the pleated condition helps maintain the vent opening in a closed condition at least partially blocking fluid flow through the vent opening, the edge portion when unfolded from the pleated condition placing the vent opening in an open condition permitting fluid flow through the vent opening.

12. An apparatus for helping to protect an occupant of a vehicle, the apparatus comprising:
an inflatable vehicle occupant protection device comprising a panel of material that helps define an inflatable volume of the protection device;
a vent opening for venting inflation fluid from the inflatable volume; and
a pleat folded in the panel, the pleat being positioned against a vehicle surface while the protection device is in a normally deployed condition to help block inflation fluid from venting through the vent opening, wherein the vent opening is at least partially defined by an edge portion of the panel, the edge portion being folded in the pleat, and wherein the edge portion is defined by a notch in the panel.

13. An apparatus for helping to protect an occupant of a vehicle, the apparatus comprising:
an inflatable vehicle occupant protection device comprising a panel of material that helps define an inflatable volume of the protection device;
a vent opening for venting inflation fluid from the inflatable volume; and
a pleat folded in the panel, the pleat being positioned against a vehicle surface while the protection device is in a normally deployed condition to help block inflation fluid from venting through the vent opening, wherein the vent opening is at least partially defined by an edge portion of the panel, the edge portion being folded in the pleat, and wherein the edge portion is defined by a slot in the panel.

14. An apparatus for helping to protect an occupant of a vehicle, the apparatus comprising:
an inflatable vehicle occupant protection device comprising a panel of material that helps define an inflatable volume of the protection device;
a vent opening for venting inflation fluid from the inflatable volume;
a pleat folded in the panel, the pleat being positioned against a vehicle surface while the protection device is in a normally deployed condition to help block inflation fluid from venting through the vent opening; and
a connection that interconnects the panel with adjacent portions of the protection device to help maintain the pleated configuration of the panel adjacent the connection, pleated portions of the panel spaced from the connection being capable of unfolding from the pleated configuration to vent inflation fluid through the vent opening, wherein the vent opening is configured as an elongated slot in the panel, the panel comprising a first edge portion extending along a first side of the slot and a second edge portion extending along a second side of the slot, the pleat extending across the first and second edge portions, the connection maintaining the pleat in the first edge portion, the second edge portion being capable of unfolding from the pleated condition to place the vent opening in an open condition venting inflation fluid from the inflatable volume.

15. An apparatus for helping to protect an occupant of a vehicle, the apparatus comprising:
- an inflatable vehicle occupant protection device comprising a panel of material that helps define an inflatable volume of the protection device;
- a vent opening for venting inflation fluid from the inflatable volume;
- a pleat folded in the panel, the pleat being positioned against a vehicle surface while the protection device is in a normally deployed condition to help block inflation fluid from venting through the vent opening; and
- a connection that interconnects the panel with adjacent portions of the protection device to help maintain the pleated configuration of the panel adjacent the connection, pleated portions of the panel spaced from the connection being capable of unfolding from the pleated configuration to vent inflation fluid through the vent opening, wherein the vent opening is configured as an elongated notch in the panel, the panel comprising opposite end portions extending along opposite ends of the notch and an edge portion extending along the length of the notch between the end portions, the edge portion being folded in the pleat thus positioning the end portions relative to each other a distance shorter than the length of the edge portion, the connections fixing the relative positions of the end portions, the edge portion being capable of unfolding from the pleated condition to place the vent opening in an open condition venting inflation fluid from the inflatable volume.

16. An apparatus for helping to protect an occupant of a vehicle, the apparatus comprising:
- an inflatable vehicle occupant protection device comprising a panel of material that helps define an inflatable volume of the protection device;
- a vent opening comprising a notch in the panel, the panel comprising opposite end portions extending along opposite ends of the notch and an edge portion extending along the length of the notch between the end portions;
- a pleat folded in the panel, the edge portion being folded in the pleat thus positioning the end portions relative to each other a distance shorter than the length of the edge portion; and
- a connection interconnecting the end portions with adjacent panel portions of the protection device, the connection fixing the relative positions of the end portions, the edge portion being capable of unfolding from the pleated condition to place the vent opening in an open condition for venting inflation fluid from the inflatable volume.

\* \* \* \* \*